US012497804B2

(12) United States Patent
Tsai

(10) Patent No.: US 12,497,804 B2
(45) Date of Patent: Dec. 16, 2025

(54) CHAIN LOCK

(71) Applicant: Cheng-Yu Tsai, Hemei Township (TW)

(72) Inventor: Cheng-Yu Tsai, Hemei Township (TW)

( * ) Notice: Subject to any disclaimer, the term of this patent is extended or adjusted under 35 U.S.C. 154(b) by 62 days.

(21) Appl. No.: 18/502,662

(22) Filed: Nov. 6, 2023

(65) Prior Publication Data

US 2024/0392610 A1 Nov. 28, 2024

(30) Foreign Application Priority Data

May 26, 2023 (EP) .................................... 23175535

(51) Int. Cl.
*E05B 71/00* (2006.01)

(52) U.S. Cl.
CPC .................................. *E05B 71/00* (2013.01)

(58) Field of Classification Search
CPC ...... E05B 71/00; E05B 73/00; E05B 73/0005; E05B 67/003
USPC .......................................................... 70/233
See application file for complete search history.

(56) References Cited

U.S. PATENT DOCUMENTS

| | | | | |
|---|---|---|---|---|
| 8,302,436 | B2 * | 11/2012 | Cheung | E05B 67/003 70/30 |
| 8,756,960 | B2 * | 6/2014 | Poehlmann | E05B 73/0011 70/52 |
| 2012/0151973 | A1 * | 6/2012 | Cheung | E05B 67/003 70/53 |
| 2017/0043828 | A1 * | 2/2017 | Mohamed | E05B 45/06 |

FOREIGN PATENT DOCUMENTS

CN 109972930 B * 5/2020

* cited by examiner

*Primary Examiner* — Nathan Cumar
(74) *Attorney, Agent, or Firm* — Muncy, Geisler, Olds & Lowe, P.C.

(57) ABSTRACT

A chain lock comprises a lock body with a cylindrical shape and a chain connected to the lock body at one end and to a bolt at the other end. The lock body has two shells, with the second shell sleeved within the first shell. Inside the second shell, there is a lock core, a lock seat, and an installation seat. The lock seat and the chain are connected at opposite ends of the installation seat. An actuating element connects the lock core and the lock seat, allowing them to rotate simultaneously. The side wall of the lock seat features an insertion portion for inserting the bolt comprising a first slot and a second slot, wherein the width of the first slot is greater than the width of the second slot.

4 Claims, 6 Drawing Sheets

CHAIN LOCK

FIELD OF THE INVENTION

The present disclosure relates to a chain lock, particularly an easy-to-operate chain lock.

BACKGROUND OF THE INVENTION

Bicycles are often secured with locks to prevent theft. Most chain locks are keyed by inserting the chain into the lock. However, if the chain is not operated carefully, it can get stuck in the locking structure inside the lock (such as a snap hook) and cannot be locked, making it inconvenient to operate.

SUMMARY OF THE INVENTION

In response to the above problems, the present disclosure provides a chain lock, in particular an easy-to-operate chain lock.

The chain lock comprises a lock body and a chain, one end of the chain is connected to the lock body and the other end is connected to a bolt. The lock body has a cylindrical lock seat and a lock core that rotate together. The side wall of the lock seat features an insertion portion that defines a width in the axial direction. The insertion portion has a first slot and a second slot connected along the direction of rotation of the lock body, where the width of the first slot is greater than the width of the second slot.

Wherein, an actuating element connects the lock seat to the lock core.

Wherein, the bolt has an inserter disposed on a base with a circular groove between its top and bottom.

Wherein, the lock body also comprises a first shell and a second shell sleeved within the first shell. The first shell has a first jack in the radial direction, and the second shell has a second jack in the radial direction. The first jack, second jack, and insertion portion are connected.

Wherein, the first shell has a first perforation in the axial direction, and the second shell has a second perforation in the axial direction. Both perforations are connected to a keyhole of the lock core for a key insertion.

Wherein, the lock core and the lock seat are disposed within the second shell.

Wherein, the lock body further comprises an installation seat inside the second shell, which connects to the chain and the lock seat.

DESCRIPTION OF THE PREFERRED EMBODIMENTS

To clearly illustrate the specific method of implementation, structure, and effect achieved by the present disclosure, the following embodiments are provided and illustrated with drawings:

Referring to FIGS. 1 to 6, a chain lock is shown having a lock body 10 with a cylindrical shape and a chain 20, wherein one end of the chain 20 is connected to the lock body 10 and the other end is connected to a bolt 30.

Figure 1:
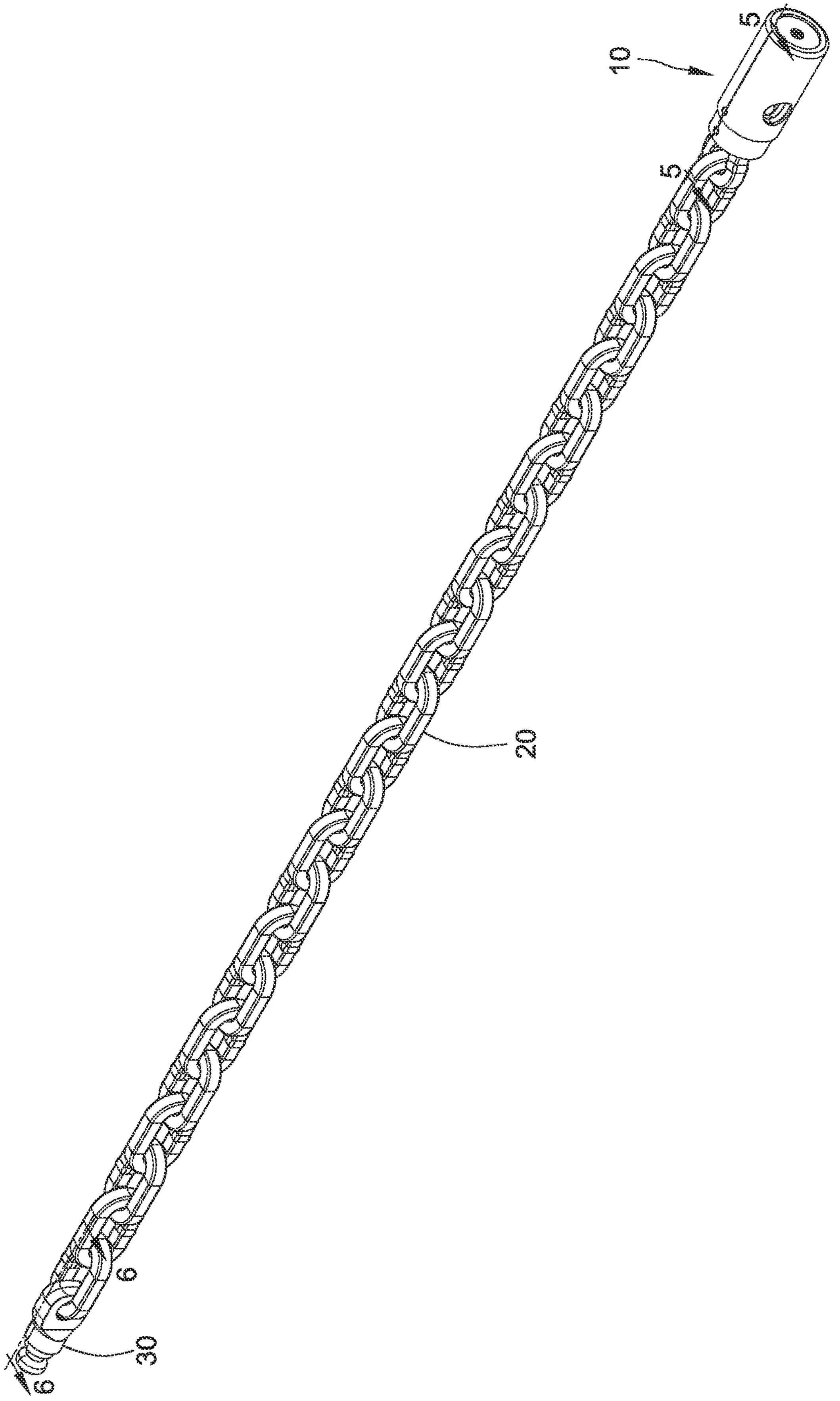
FIG. 1 is a schematic diagram of an embodiment of the present disclosure.
Figure 2:
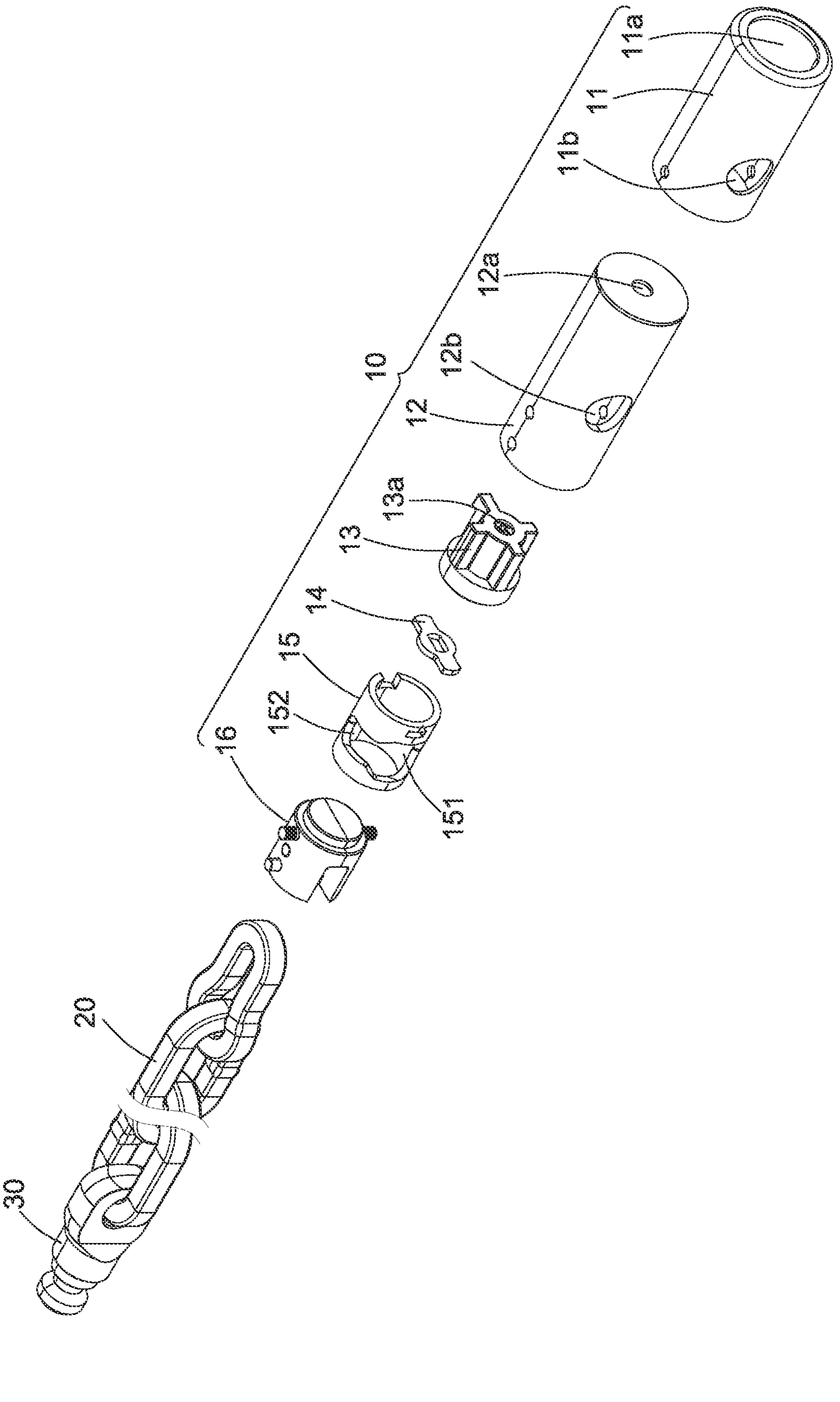
FIG. 2 is an exploded view of the components of the lock body of an embodiment of the present disclosure.
Figure 3:
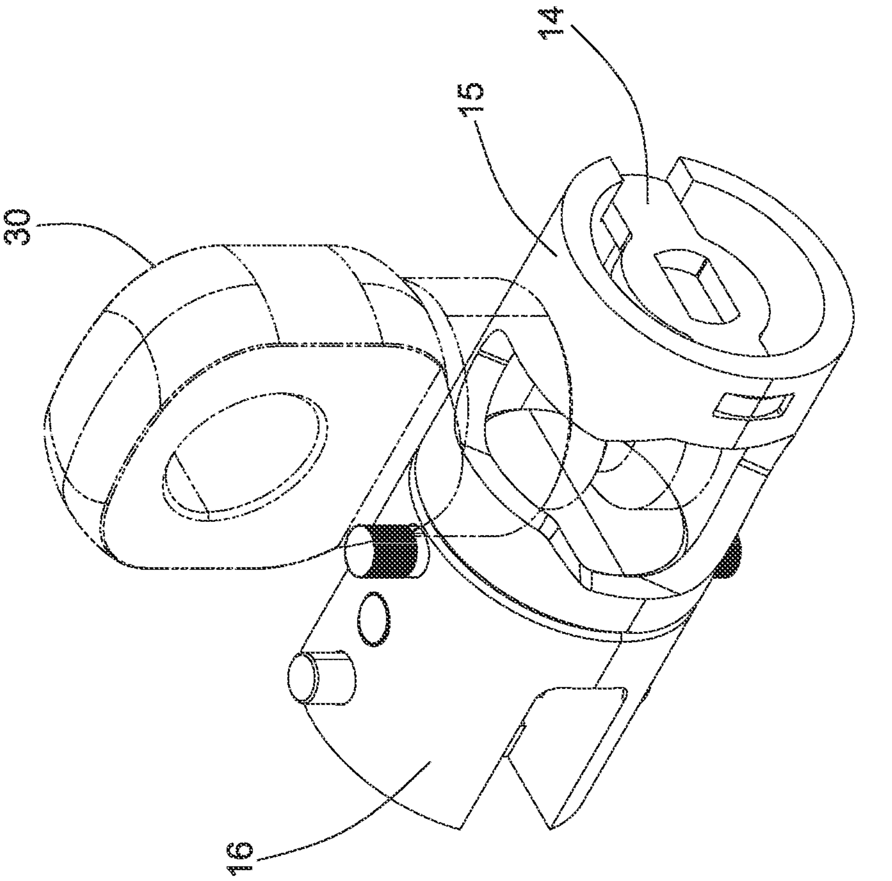
FIG. 3 is a schematic diagram of the locked state of an embodiment of the present disclosure.
Figure 4:
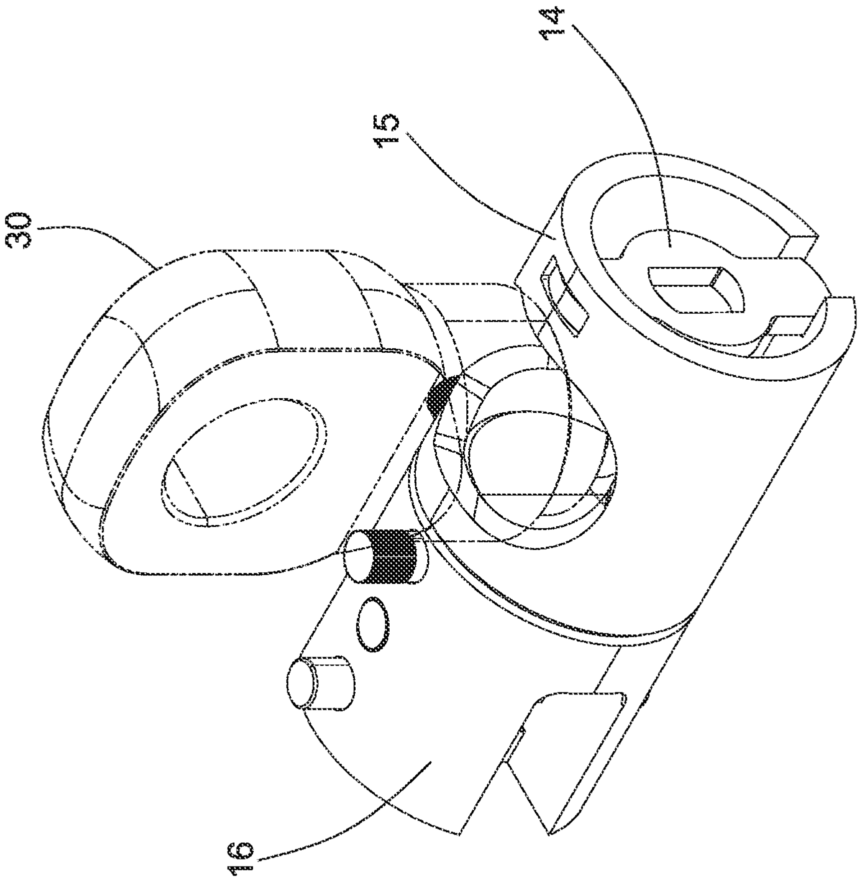
FIG. 4 is a schematic diagram of the unlocked state of an embodiment of the present disclosure.
Figure 5:
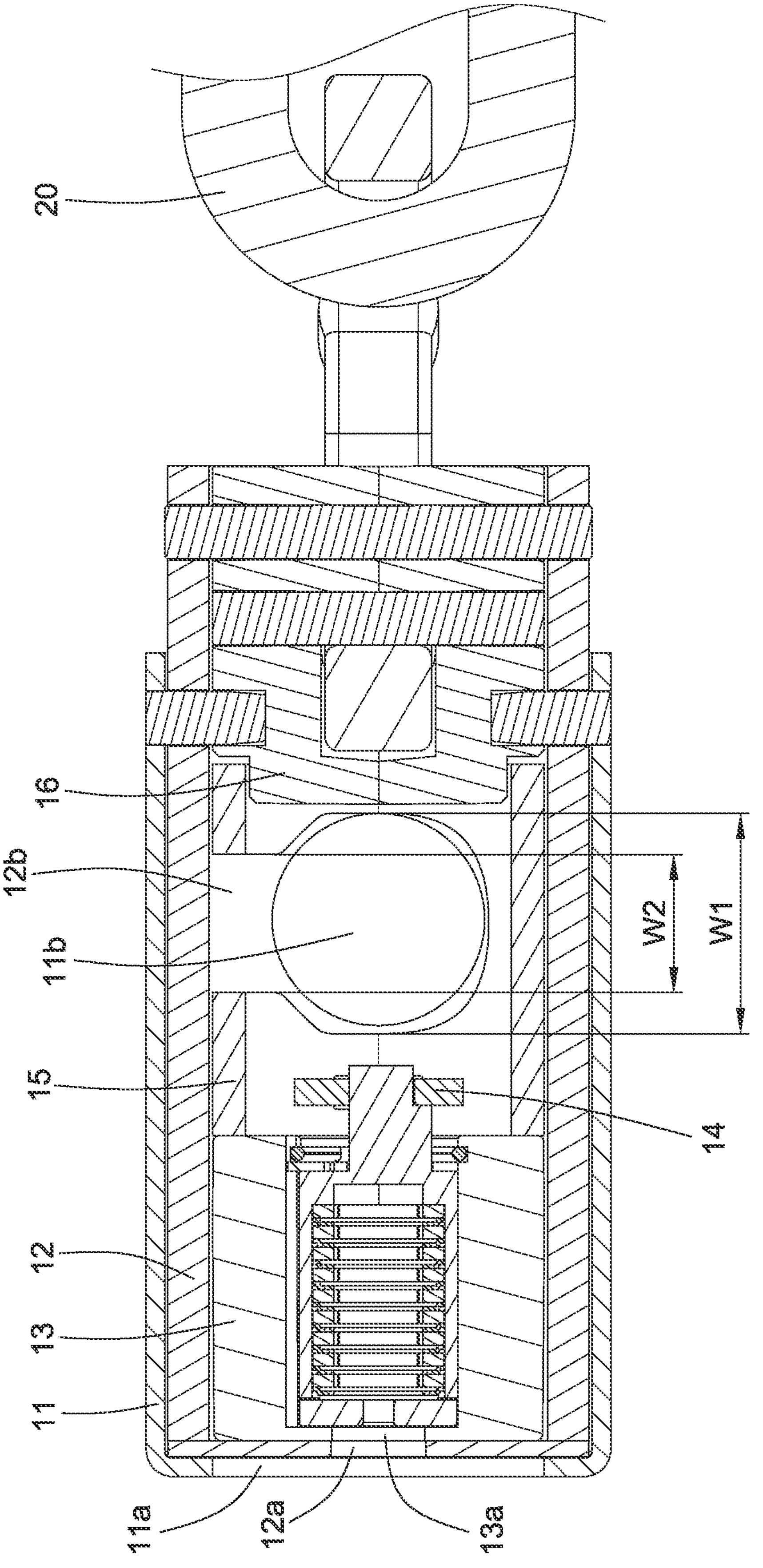
FIG. 5 is a cross-sectional view of the lock body of an embodiment of the present disclosure.

The lock body 10 comprises a first shell 11 and a second shell 12 which is sleeved within the first shell 11, and a lock core 13, a lock seat 15, and an installation seat 16 are disposed within the second shell 12. The installation seat 16 connects to the lock seat 15 at one end and to the chain 20 at the other end. An actuating element 14 is sleeved within one end of the lock core 13 and is connected to the lock seat 15 via the two wings of the actuating element 14, allowing simultaneous rotation of the lock core 13 and the lock seat 15. The lock core 13 has a keyhole **13*a* for inserting a key. When the key is inserted, the lock core 13 and the lock seat 15 rotate together to form either a locked state (as shown in FIG. 3) or an unlocked state (as shown in FIG. 4). Wherein, the first shell 11 has a first perforation 11*a* in the axial direction, and the second shell 12 has a second perforation 12*a* in the axial direction, both of which are connected to the keyhole 13*a***.

In this embodiment, the side wall of the lock seat 15 features an insertion portion for the insertion of the bolt 30 defining a width in the axial direction. The insertion portion has a first slot 151 and a second slot 152 connected to each other, wherein the width W1 of the first slot 151 is greater than the width W2 of the second slot 152, defining the approximate T-shape of the insertion portion. Wherein the first shell 11 has a first jack **11*b* in the radial direction and the second shell 12 has a second jack 12*b*** in the radial direction, both of which are connected to the insertion portion.

Figure 6:
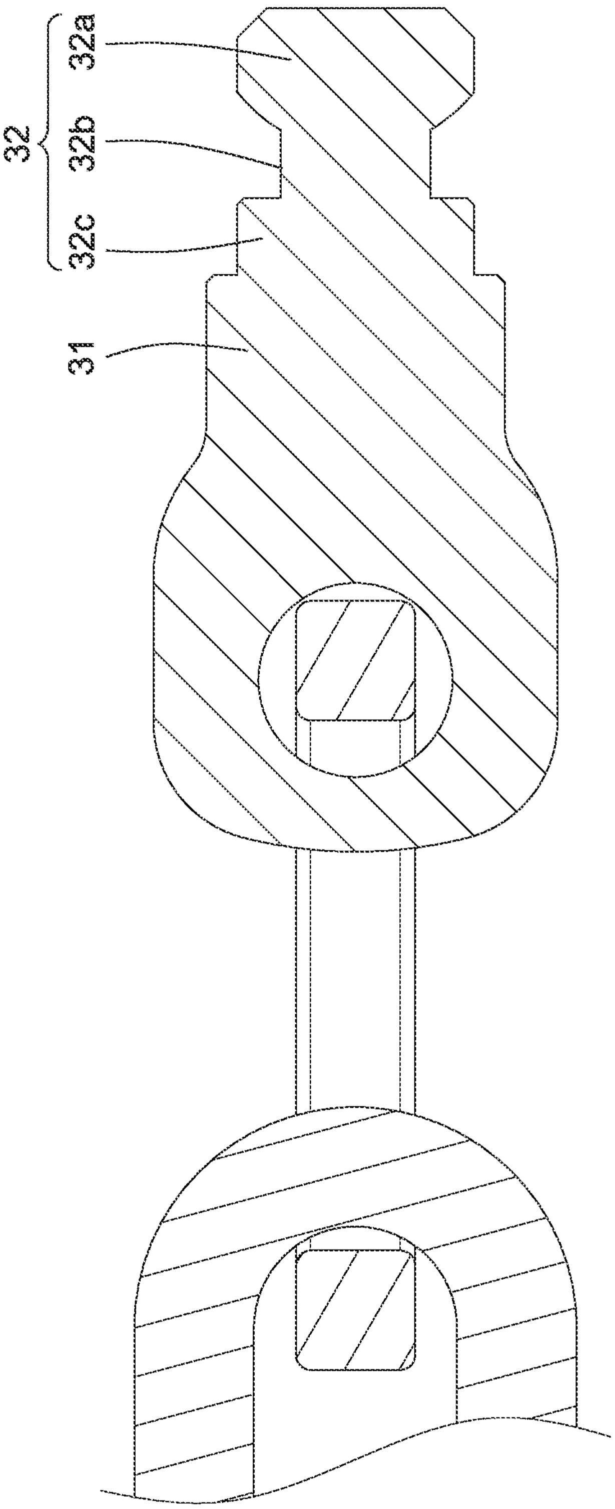
FIG. 6 is a cross-sectional view of the bolt of an embodiment of the present disclosure.

Referring to FIG. 6, the bolt 30 has an inserter 32 disposed on a base 31 with a circular groove **32*b* between its top 32*a* and bottom 32*c***.

Referring to FIG. 3, when the bolt 30 is inserted into the insertion portion, it is located in the first slot 151. When the user rotates the lock core 13 counterclockwise with the key, the lock seat 15 simultaneously rotates counterclockwise until the bolt 30 contacts the wall of the second slot 152 to form the locked state. At this time, the wall of the circular groove **32*b* of the bolt 30 is attached to the wall of the second slot 152 to achieve an effect of limiting the movement of the bolt 30**.

Referring to FIG. 4, when the user rotates the lock core 13 clockwise with the key, the lock seat 15 simultaneously rotates clockwise until the bolt 30 contacts the wall of the first slot 151 (i.e., the bolt 30 is disengaged from the second slot 152), forming the unlocked state.

What is claimed is:

1. A chain lock, having a lock body and a chain, one end of the chain is connected to the lock body and the other end is connected to a bolt, the lock body has a cylindrical lock seat and a lock core that rotate together, the side wall of the lock seat features an insertion portion that defines a width in an axial direction, wherein the insertion portion has a first slot and a second slot connected along the direction of rotation of the lock body, where the width of the first slot is greater than the width of the second slot;

wherein an actuating element connects the lock seat to the lock core;

wherein the lock body also comprises a first shell and a second shell sleeved within the first shell, the first shell has a first jack in the radial direction, and the second shell has a second jack in the radial direction, the first jack, the second jack, and the insertion portion are connected;

wherein the lock core and the lock seat are disposed within the second shell.

2. The chain lock according to claim 1, wherein the bolt has an inserter disposed on a base with a circular groove between its top and bottom.

3. The chain lock according to claim 1, wherein the first shell has a first perforation in the axial direction, and the second shell has a second perforation in the axial direction, both perforations are connected to a keyhole of the lock core for a key insertion.

4. The chain lock according to claim 1, wherein the lock body further comprises an installation seat inside the second shell, which connects to the chain and the lock seat.

* * * * *